United States Patent [19]

Bellaiche et al.

[11] Patent Number: 4,483,205
[45] Date of Patent: Nov. 20, 1984

[54] APPARATUS FOR REMOVING DEPOSITS FROM IRRADIATED FUEL ELEMENTS

[75] Inventors: Hubert G. Bellaiche, Ecully; Bernard M. Gebelin, Villeurbanne, both of France

[73] Assignee: Framatome & Cie, Curbevoie, France

[21] Appl. No.: 362,822

[22] Filed: Mar. 29, 1982

[30] Foreign Application Priority Data

Apr. 17, 1981 [FR] France .................. 81 07838

[51] Int. Cl.³ .............................................. G01N 1/08
[52] U.S. Cl. ............................. 73/863.23; 73/864.31; 73/864.33; 73/864.41; 376/245; 376/310; 376/313
[58] Field of Search ............... 376/245, 250, 251, 253, 376/310, 313; 73/863.23, 863.24, 863.25, 864.31, 864.33, 864.41

[56] References Cited
U.S. PATENT DOCUMENTS 3,843,198 10/1974 Reynolds ................... 73/864.33
4,056,972 11/1977 Bromwich .................. 376/245
4,386,473 6/1983 Amann ..................... 73/864.41

Primary Examiner—S. Clement Swisher
Attorney, Agent, or Firm—Pollock, Vande Sande & Priddy

[57] ABSTRACT

Apparatus for removing deposit from fuel elements of a nuclear reactor, by scraping the elements C by means of a remote-controlled scraping device entering the pool A of the reactor. The scraped sample is sucked, together with a certain amount of liquid, into an intermediate reservoir (20), the liquid removed with the sample is passed into a detachable filtration chamber (3), which retains the sample, the liquid being led into a buffer reservoir (21), and the filtration chamber (3) is introduced into a storage container (4), all the operations being carried out under the protection of shielded walls.

9 Claims, 14 Drawing Figures

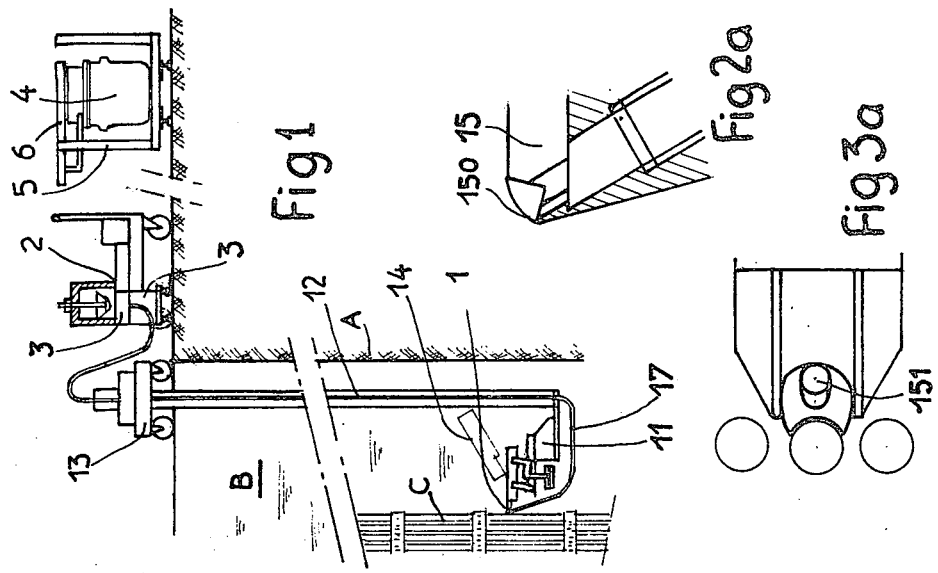
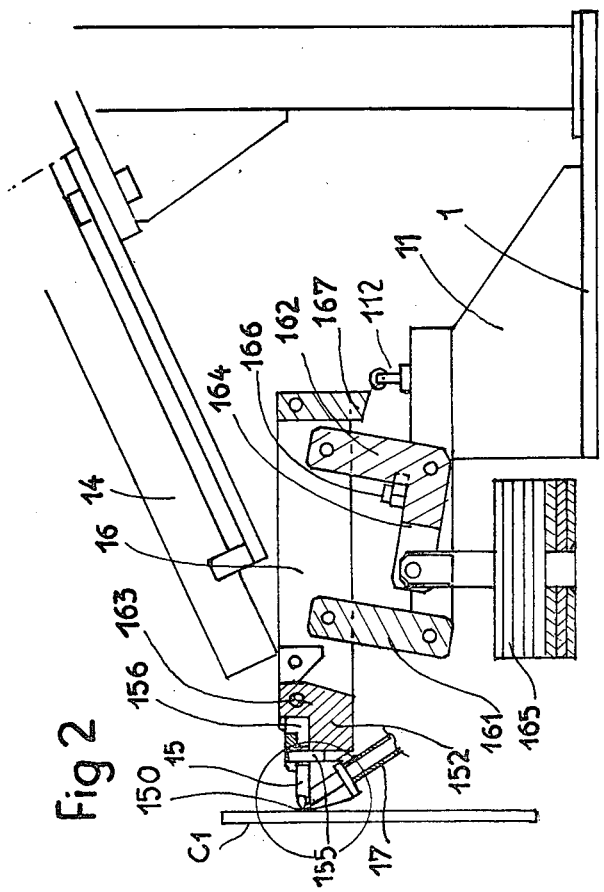
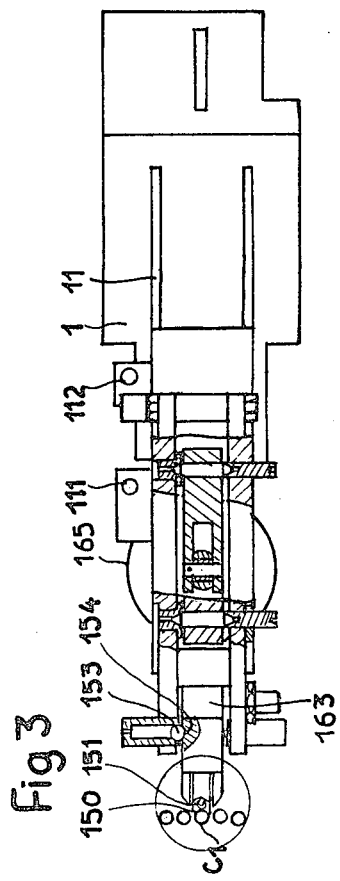

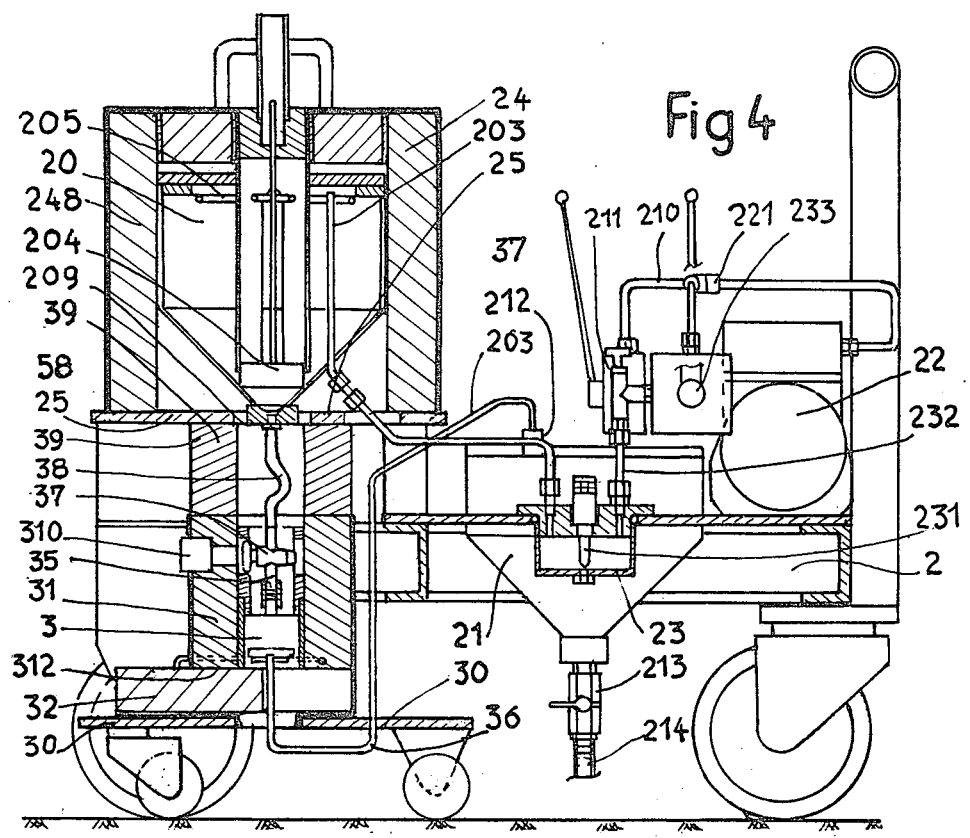
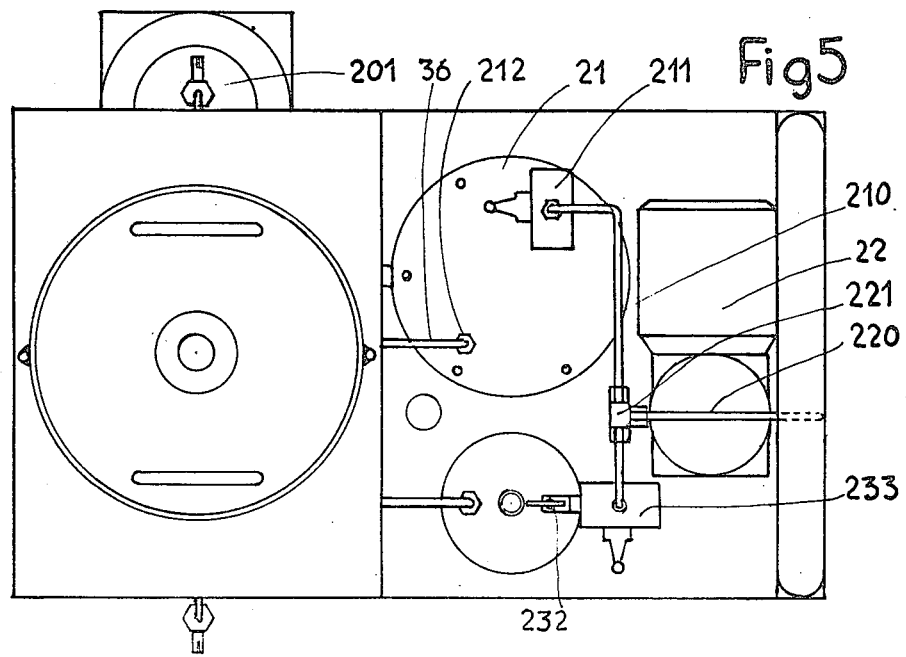

APPARATUS FOR REMOVING DEPOSITS FROM IRRADIATED FUEL ELEMENTS

FIELD OF THE INVENTION

The invention relates to equipment for removing deposit from irradiated fuel elements of a nuclear reactor, which are immersed in a pool, in order subsequently to analyze the nature of this deposit.

BACKGROUND OF THE INVENTION

Once they have been removed from the core of a nuclear reactor, the irradiated fuel arrays are placed in a deactivating pool and stored there for a certain time. During this period, a certain number of checks are carried out on the clusters of rods constituting the arrays, in order to gain further knowledge of the behavior of the fuel during its irradiation. For the same purpose, another operation to which the invention applies consists in removing and collecting the deposit formed, during the irradiation, on certain zones of the rods located at the periphery of the fuel arrays. It is in fact of value to be able subsequently to analyze (off site) the nature of this deposit and to determine its amount.

The devices used to date and described, for example, in the article published in May 1976 in "NUCLEAR TECHNOLOGY" (page 166) are essentially manual devices: a scraping head at the end of a manually operated pole. No biological protection is provided in the system itself, which leads to handling difficulties both technically and in terms of regulations.

SUMMARY OF THE INVENTION

The invention relates to removal of deposit from nuclear fuel elements in total safety, by means of equipment which can optionally be remote-controlled and of which all the parts containing irradiated substances are located in shielded containers.

According to the invention, when a sample has been removed from a fuel element in the pool, by means of a remote-controlled scraping device, the scraped sample is sucked, together with a certain amount of liquid, into an intermediate reservoir, the liquid removed with the sample is passed into a detachable filtration chamber, which retains the sample, the liquid being led into a buffer reservoir, and the filtration chamber is moved into a storage container, all the operations being carried out under the protection of shielded walls.

The removal equipment according to the invention comprises an intermediate reservoir and a buffer reservoir, each separately connected to a vacuum pump by a pipe fitted with a valve, a duct for sucking the scraped sample, which emerges at one end near the scraping device and at the other end in the intermediate reservoir, and a filtration chamber connected on one side to the lower part of the intermediate reservoir by a draining pipe, and on the other side to the buffer reservoir by a pipe for discharging the filtered liquid.

According to an additional characteristic, the removal equipment comprises a container for storing the samples removed and a means for moving the filtration chamber between a removal position, in which the filtration chamber is detachably fixed to the intermediate reservoir and to the buffer reservoir, and a position for introduction into the storage container.

In a preferred embodiment, the intermediate reservoir is located in a raised position and the filtration chamber is mounted on a movable support carriage capable of being placed underneath the intermediate reservoir, in the removal position, and above the storage container, in the discharge position of the filtration chamber, the latter being connected to the intermediate reservoir and to the buffer reservoir by flexible pipes fitted with detachable fixing means and with closing valves.

The invention will now be described in greater detail with reference to a particular embodiment, which is given by way of example and is shown in the attached drawings.

BRIEF DESCRIPTION OF THE DRAWINGS

FIG. 1 is a general diagrammatic view of the apparatus according to the invention.

FIG. 2 is a detailed view in elevation of the scraping device,

FIG. 2a being a detail of the blade on an enlarged scale.

FIG. 3 is a plan view of the scraping device, partially in horizontal section,

FIG. 3a being a detail of the blade.

FIG. 4 is a view in elevation, in longitudinal section, of the removal and filtration equipment.

FIG. 5 and FIG. 6 are, respectively, a top view and a side view of the equipment of FIG. 4.

DESCRIPTION OF PREFERRED EMBODIMENT

Figure 12:
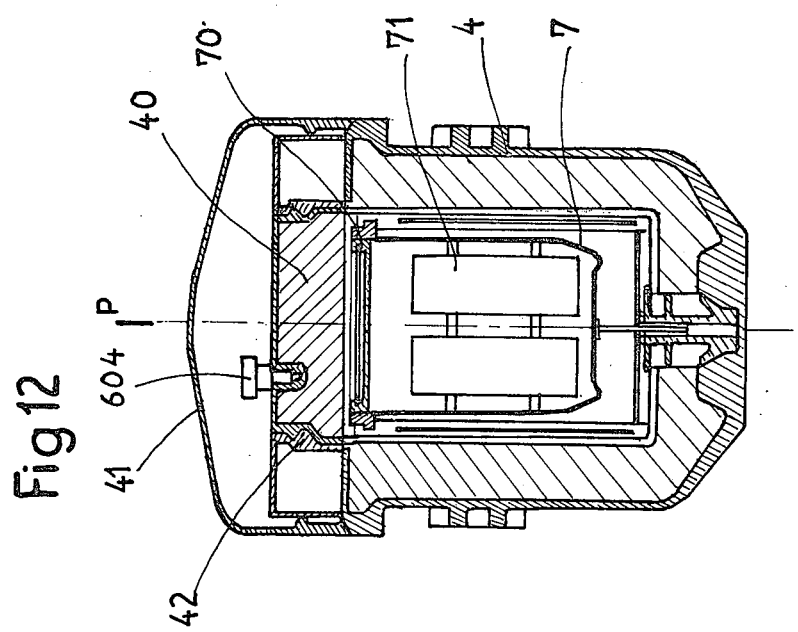
FIG. 12 is a view in axial section of the transporting container.

FIG. 1 shows very diagrammatically the deactivating pool A of a nuclear reactor, which is filled with a cooling liquid B, normally water, and in which a fuel array C is located.

Samples of deposit are removed by a scraping device 1 by means of a removal device 2 comprising a filtration chamber 3 which can be located in a transporting container 4 arranged in a positioning cradle 5 fitted with a charging slide 6.

The scraping head 1 is mounted on a support 11 fixed to the end of a vertical arm 12 which enters the pool A and which is fitted to a support, for example a carriage 13 enabling it to move along all three axes relative to the fuel array C to be examined.

A camera 14 and projectors are fixed to the brace 11 in an orientation which gives a correct view of the zone to be scraped.

The scraping head 1 has been shown in detail in FIGS. 2 and 3. It essentially comprises a scraping blade 15 fixed to the end of an arm 16 joined to the base 11 by two connecting pieces 161, 162 forming a hinged parallelogram, enabling the arm 16 to move parallel to itself in the horizontal direction.

At its end, the blade 15 is fitted with a rib 150, the profile of which matches the shape of the rod C1 with which it is in contact (FIGS. 2a, 3a), which forms the rim of a funnel-shaped hole 151, in the bottom of which emerges the end of a suction duct 17 connected to the removal equipment, which will be described below.

The blade 15 is fixed to a support 152, which is hinged to the end of the arm 16 about a horizontal axle 163, so that it can pivot under the action of a vertical force greater than a threshold adjusted, for example, by two beads 153 pushed by a spring into a depression 154. Furthermore, the blade is mounted so as to pivot on the support 152 about a vertical axle 155, and it is returned to the central position by a leaf spring 156.

One of the connecting pieces, 162, for supporting the arm 16 is extended at right angles by a bent part 164, at the end of which a counterweight 165 is suspended. By abutting against the base 11, a wedge 166, fixed to the arm 164, can limit the forward movement of the arm when the latter is not touching a rod. Furthermore, the base 11 (FIG. 3) carries two switches 111,112, which are controlled by a stop 167 firmly fixed to the arm 16, and which respectively correspond in one case (111) to the start of the backward movement of the blade-carrying arm, i.e., to the point where the arm comes alongside the rod C1, and in the other case (112) to the limiting point of penetration of the blade-carrying arm. The spacing between the switches 111 and 112, which can be adjusted, makes it possible to assure that the blade-carrying arm 16 exerts the intended force on the rod C1, irrespective of the profile of the latter.

The suction duct 17, the end of which emerges in the funnel 151 of the blade 15, runs back along the vertical arm 12 as far as the removal apparatus 2, shown in detail in FIGS. 4 to 7.

The removal apparatus essentially comprises a chassis 2 on which an intermediate reservoir 20, a buffer reservoir 21 and a vacuum pump 22 are mounted.

Moreover, as will be seen below, the chassis 2 is raised so as to permit the positioning of a filtration chamber 3 underneath the intermediate reservoir 20.

Figure 6:
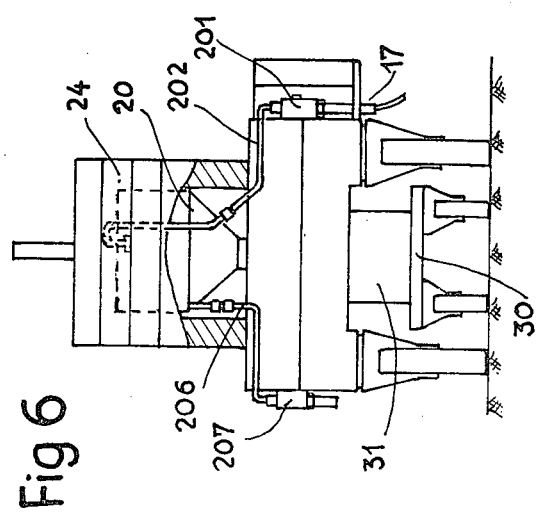

The end of the tube 17 is connected, via a tap 201, to a tube 202 which emerges from the upper part of the reservoir 20 by means of a swan neck, as shown in FIG. 6.

A tube 203 also emerges from the upper part of the intermediate reservoir 20; this tube connects the intermediate reservoir 20 to the vacuum pump 22 via a safety trap 23 which consists of a tank equipped with a level-detector 231, and into which emerge on the one hand the tube 203 and on the other hand a tube 232 equipped with a valve 233 and connected to the suction tube 220 of the vacuum pump 22 by means of a fork 221 to which the buffer reservoir 21 is also connected by a suction pipe 210 equipped with a valve 211.

By virtue of this unit, by opening the tap 201 and the valve 233, the valve 211 being closed, it is possible to evacuate the intermediate reservoir 20 at the time when the rod C1 is being scraped, so that the sample of deposit removed by the blade 15 is sucked through the pipe 17, together with a certain amount of liquid, which is collected in the intermediate reservoir 20, the safety trap 23 protecting the pump 22 from sucking in liquid inadvertently.

The reservoir 20 is equipped with a level inspection window 204 and also with rinsing ledges 205 fed by a tube 206 fitted with a tap 207.

The reservoir 20 therefore contains the irradiated samples and it is for this reason that it is located inside a shielded container 24. Furthermore, the bottom of the reservoir 20 has a conical shape and emerges in a draining orifice 209 making it possible to discharge the stored liquid.

In fact, when the reservoir 20 is filled, or if it is desired at any time to analyze the sample removed, it is possible to collect the latter in the filtration chamber 3 detachably arranged under the reservoir 20. For this purpose, the chamber 3 is mounted on a carriage 30, which can be placed under the reservoir 20, the chassis 2 being raised for this purpose.

Figure 7:
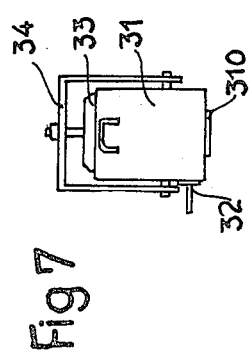
FIG. 7 is a detailed view of the container for transferring the filtration chamber.

The filtration chamber 3, of cylindrical shape, contains a filter of known type and is located inside a shielded container shown in the transportation position in FIG. 7 and consisting of a side wall 31, the lower face 312 of which can be closed by a sealing wall 32 forming a slide, and the upper face 311 of which can be closed by a cover 33 detachably fixed by a yoke 34 enabling the unit to be transported. When the container 31 is placed on the carriage 30 underneath the reservoir 20, the cover 33 is removed and the slide 32 is opened. A draining pipe 35 emerges into the upper part of the chamber 3 and a discharge pipe 36 emerges into the lower part. The draining pipe 35 is fitted with a tap 37 and is connected by a flexible pipe 38 to the draining orifice 209 of the intermediate reservoir 20, via a detachable fixing device.

The discharge pipe 36 is a flexible pipe which can be connected, via a detachable fixing device, to an orifice 212 of the buffer reservoir 21 (FIG. 5).

The flexible pipe 38 for draining the intermediate reservoir 20 is located in a space between the lower face 25 of the container 24 and the upper face of the container 31. After the positioning of the carriage 30 and the connection of the pipe 38 to the orifice 209, this space is occupied by a detachable shielded wall 39 which surrounds the pipe 38.

Thus, after positioning of the pipe 38 and the wall 39, the tap 37 is opened through an orifice which is provided in the side wall of the container 31 and which can be sealed by a detachable plug 310, and the buffer reservoir 21 is evacuated by opening the valve 211, the valve 233 being closed.

The liquid stored inside the intermediate reservoir 20 passes into the filtration chamber 3, the removed deposit being retained by the filter while the filtered liquid is sucked into the buffer reservoir 21.

The latter is fitted with a funnel-shaped bottom closed by a tap 213 to which a pipe 214 is connected, which makes it possible to return the filtered liquid to the pool A.

By virtue of the arrangements which have been described, it has thus been possible to collect, in the filtration chamber 3, the samples of deposit scraped off by the blade 15, this operation being carried out in total safety because all the enclosures and all the pipes containing irradiated deposits are surrounded by shielding.

The filtration chamber 3 containing the irradiated deposit must also be stored in a shielded container. A "dustbin" of known type, located inside a transporting container 4, which is also known, is used for this purpose.

By way of example, FIG. 12 shows a container 4 consisting of a shielded wall closed in its upper part by a shielded sliding key 40 and by a cover 41. A standard dustbin 7 is located inside the transporting container 4.

Figure 8:
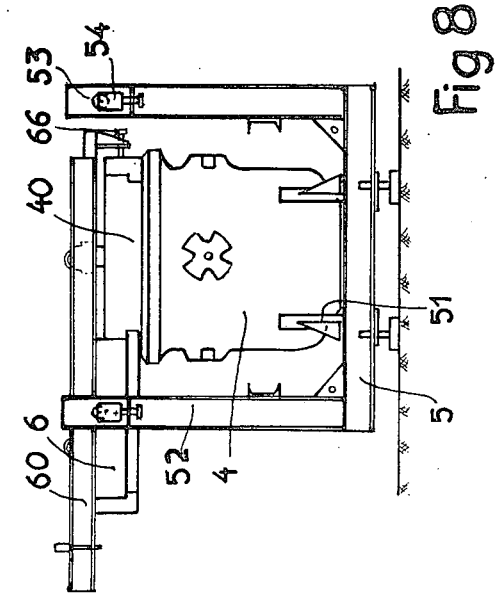
FIG. 8 is a view in elevation of the transporting container mounted on a positioning cradle.
Figure 9:
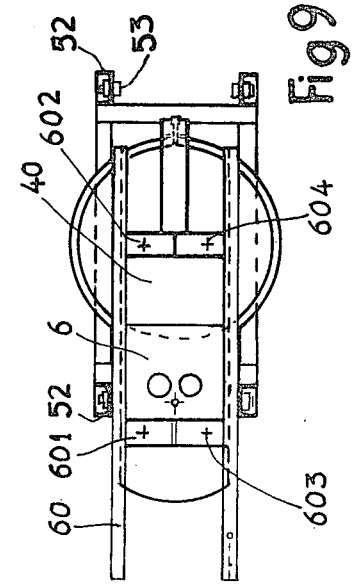
FIG. 9 is a top view of FIG. 8.

To introduce the filtration chamber 3 into the dustbin 7, under protection, a positioning cradle 5, shown in FIGS. 8 and 9, is used.

The cradle 5 consists essentially of a metal frame, inside which the container 4 has been placed. This frame is mounted on four adjustable feet to assure that the unit is horizontal. It comprises a plinth on which the container 4, positioned by stops 51, is placed, and four vertical pillars 52 supporting rollers 53 mounted so as to rotate around horizontal axles on bases 54 of adjustable height.

The rollers 53 define a sliding plane for the slide 6, which is fixed to a coupling frame 60 consisting of two parallel sections, which roll over the rollers 53 and which are connected by cross-pieces 601, 602, the slide 6 being fixed to the chassis 60 by screws 603 passing through orifices in the cross-piece 601.

Figure 10:
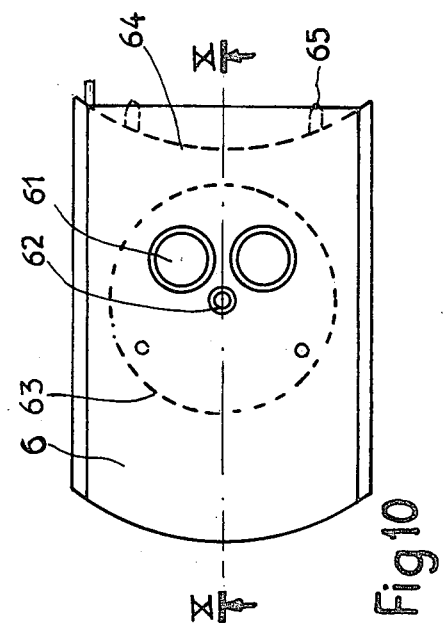
FIG. 10 is a top view of the charging slide.
Figure 11:
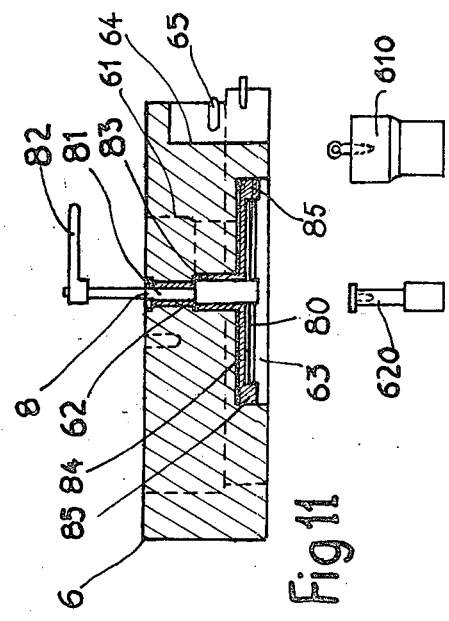
FIG. 11 is a view in section along X—X of FIG. 10.

The slide 6 is shown in greater detail in FIGS. 10 and 11. It consists of a mechanically welded box into which lead has been cast to assure biological protection. Two charging holes 61 with vertical axes are provided in this box. These holes have a slightly larger diameter than that of the filtration chamber 3 and can be sealed by a detachable plug 610 (FIG. 11).

Four cells 71 for receiving the filters have been placed inside the dustbin 7 (FIG. 12) and are arranged in pairs on either side of the vertical plane of symmetry P of the transporting container and of the slide 6. The center-to-center distance between the orifices 61 in the slide 6 corresponds to the distance between the cells 71 of the dustbin 7.

Furthermore, the transporting container 4 is closed in a known manner by a sliding wedge 40, which can move along the slide rails 42 parallel to the plane P and to the sections 60.

Likewise, the dustbin 7, of standard type, is closed by a cover 70, which can be opened and removed by a gripping tool 8 of known type, shown in section in FIG. 11.

This tool 8 consists, for example, of four gripping clamps 80 fixed, in the form of a cross, to the end of an axle of rotation 81 actuated by a detachable operating key 82 and passing through a sleeve 83, at the base of which are attached fixed arms 84 corresponding to the clamps 80 and fitted at their ends with centering pins 85 which can engage in corresponding recesses made in the cover 70 of the dustbin. This cover is provided with an annular groove in which the clamps 80 engage when the key 82 is rotated.

When a removed sample is transported, the container 4 of the dustbin 7 is first placed on the cradle 5. The gripping tool 8 is mounted on the slide 6. For this purpose, the operating key 82 being detachable, the sleeve 83 is threaded into the central orifice 62 in the slide, the clamps 80 and the fixed arms 84 coming into position in a recess 63 provided for this purpose in the lower face of the slide 6.

On the same side as the wedge 40, the slide 6 is provided with a concave face 64, the radius of which corresponds to that of the side wall of the wedge. Moreover, the face 64 possesses centering pins 65 which can engage in corresponding orifices provided in the wedge 40. Thus, the slide 6 can press against the wedge 40, which is firmly fastened to the slide by a locking screw 66 mounted on a section located along the axis of the frame 60 and bearing on the other face of the wedge 40, and by two screws 604 for fixing to the cross-piece 602.

The unit comprising the frame 60 and the slide 6 is then slid, the latter pushing back the wedge 40 and being positioned in the opening in the container. The gripping tool 8 is then positioned above the cover 70 of the dustbin. The fixed arms 84 are lowered into the recesses provided for this purpose in the cover 70, and, by means of the key 82, the movable arms 8 are rotated and engage in the circular grooves in the cover 70. The unit can then be lifted inside the housing 63 and the slide 6 can again be slid outwards, the key 40 closing the transporting container 4.

The unit comprising the gripping device 8 and the cover 7 is then removed and the orifice 62 is sealed with a plug 620.

One of the plugs, 610, located on the same side as the cell 71 which it is desired to occupy, is removed and the container 31, the bottom of which is fitted with a centering ring 310 with a diameter equal to that of the orifice 61, is placed on the slide 6, along the axis of the open orifice 61.

If appropriate, the container is fixed to the slide 6 and the latter is then slid as previously, so as to push back and replace the wedge 40. By virtue of the continuity between the slide 6 and the wedge 40, it is possible to slide the slide a greater or lesser distance, so as to position the container above the selected cell 71. In fact, according to the position of the slide, each orifice 61 can serve two cells located on the same side of the plane of symmetry of the transporting container.

When the container 31 is in position above the cell 71, the lower slide 32 is opened and the filter 3, containing the removed deposit, falls inside the cell.

It is then possible to pull the slide 6 outwards again, to position a new container 31', on either side of the plane of symmetry, and to push back the slide 6 above the transporting container 4, so as to bring the container 31' for transferring the filter into line with the new cell.

When the four cells are filled, by repeating the same operations in the reverse order, the cover 70 of the dustbin is lifted again into the housing 63 in the slide 6, and the cover 70 is brought back above the dustbin and can thus be replaced thereon.

The wedge 40 is then placed back on the transporting container 4 and the cover 41 is closed.

It is thus apparent that, by virtue of simple equipment, of which at least some of the operating phases can easily be remote-controlled or automated, irradiated samples have been removed from the fuel rods and led into a dustbin, while being kept inside protective shielding at all times.

In general, the invention applies to any operation for the scraping, removal, filtration and conditioning of irradiated deposits from tubular elements with vertical axes, from a nuclear reactor cooled by a liquid.

We claim:

1. Apparatus for removing deposits from nuclear reactor fuel elements (C) located in a pool (A), comprising
   (a) scraping means (15) located at the end of a vertical arm (12) penetrating into the interior of said pool and arranged for remote-controlled manipulation on a support (13) displaceable above said pool;
   (b) a suction duct (17) debouching at one of its ends adjacent to said scraping means (15) and at the other of its ends into an intermediate reservoir (20);
   (c) a filtration chamber (3) detachably arranged beneath said intermediate reservoir (20) and connected upwardly to the lower portion of the latter by a draining conduit (38), and downwardly to a buffer reservoir (21) by a discharge pipe for filtered liquid;
   (d) two conduits (203, 210) respectively connecting said intermediate reservoir (20) and said buffer reservoir (21) with a vacuum pump (22); and (e) two valves (233, 211) respectively located on said conduits (203, 210) and adapted to be opened in succession so as to place said vacuum pump (22), in a first stage, into communication with said intermediate reservoir (20) for filling the latter with liquid containing a removed deposit sample, and then, in a second stage, into communication with said buffer reservoir (21) for filtration of said liquid, through the intermediary of said filtration chamber (3) in which said sample is retained.

2. Apparatus according to claim 1, comprising a container (31) for transporting the removed samples, and means (30) for moving said filtration chamber (3) between a removal position in which said filtration chamber is detachably fixed to said intermediate reservoir (20) and to said buffer reservoir (21), and a position for introducing said filtration chamber (3) into a storage container (4).

3. Apparatus according to claim 1 or 2, wherein said intermediate reservoir (20) is located in a raised position, and said filtration chamber (3) is mounted on a movable support carriage (30) capable of being placed underneath said intermediate reservoir (20), in the removal position, said filtration chamber (3) being connected to said intermediate reservoir (20) and to said buffer reservoir (21) by flexible ducts (38, 36) fitted with detachable and leak-tight fixing means.

4. Apparatus according to claim 2, wherein said intermediate reservoir (20) and said filtration chamber (3) are each located in a shielded container (24, 31), the container (31) of said filtration chamber (3) consisting of a side wall (31) surrounding said filtration chamber (3), and of two detachable walls (32, 33) for respectively sealing the upper and lower faces thereof, the upper face (311), in the removal position and after removal of one (33) of said sealing walls, being separated from a lower face (25) of the container (24) of said intermediate reservoir (20) by a space sufficient for connection of said draining conduit (38) of said intermediate reservoir (20), and a detachable shielded cylindrical wall (39) being located in said space around said draining conduit (38).

5. Apparatus according to claim 4, wherein said container (4) for storing the samples is closed in its upper part by a shielded wedge (40) mounted for horizontal sliding movement and is located on a support (5) fitted with a charging slide (6) mounted for sliding movement in the plane of said wedge (40) and capable, by sliding, of pushing back said wedge (40) and replacing it above said storage container (4), said charging slide (16) being provided with at least one orifice (6) for the passage of said filtration chamber (3), said orifice being closed by a detachable plug (610) and along the axis of which said container (31) of said filtration chamber (3) can be inserted after removal of said plug (610).

6. Apparatus according to claim 5, wherein said storage container (4) has four housings (71) for the filtration chambers, located in pairs on either side of the vertical plane of symmetry (P) of said wedge (40), parallel to the direction of displacement of the latter, and said charging slide (6) is provided with two orifices (61) located on either side of said plane of symmetry (P) and each capable, by sliding of said slide (6), of being placed successively above one of said housings (71) located on the same side of said plane of symmetry.

7. Apparatus according to claim 1, wherein said scraping means (1) comprises a blade (15) of concave shape, corresponding to the cross-section of said fuel elements and mounted at the end of a horizontal arm (16) connected to a base (11), provided at the lower end of said vertical arm (12), via means (161-165) for pushing said horizontal arm (16) horizontally towards a said fuel element (C).

8. Apparatus according to claim 7, wherein said means for pushing said horizontal arm (16) towards a said fuel element (C) comprises two parallel connecting pieces (161, 162) hinged to said base (11) and to said horizontal arm (16), the unit forming a deformable parallelogram, and a mass (165) suspended at the end of an arm (164) firmly fastened to one (162) of said connecting pieces for controlling the rotation of the latter on the same side as said fuel element (C), the horizontal movement of said horizontal arm (16) being limited by stops.

9. Apparatus according to claim 1, wherein said blade (15) forms an upwardly open dish (151), the bottom of which is provided with an orifice emerging at the end of said suction duct for sucking the removed sample.

* * * * *